United States Patent [19]
Hsu

[11] Patent Number: 6,056,491
[45] Date of Patent: May 2, 2000

[54] SCREW HAVING CUTTING TEETH FORMED ON THREADS THEREOF

[76] Inventor: Kuo-Tai Hsu, No. 70, Alley 299, Lane 12, Sec. 2, Chang Ho Street, Tainan, Taiwan

[21] Appl. No.: 09/296,432

[22] Filed: Apr. 23, 1999

[51] Int. Cl.[7] .............................. F16B 35/04; F16B 39/30
[52] U.S. Cl. ...................... 411/418; 411/311; 411/387.4
[58] Field of Search ................................ 411/309, 310, 411/311, 387.4, 418, 420, 421

[56] References Cited

U.S. PATENT DOCUMENTS

| | | | |
|---|---|---|---|
| 924,273 | 6/1909 | Rehse | 411/418 |
| 2,200,227 | 5/1940 | Olson | 411/418 X |
| 3,083,609 | 4/1963 | Lovisek | 411/418 X |
| 5,044,853 | 9/1991 | Dicke | 411/311 |
| 5,895,187 | 4/1999 | Hsu | 411/311 X |

*Primary Examiner*—Neill Wilson
*Attorney, Agent, or Firm*—Rosenberg, Klein & Lee

[57] ABSTRACT

A screw includes a straight portion and a cutting screw-in portion tapered toward a pointed end. A cutting thread is provided on the tapered screw-in portion. The cutting thread has several cutting teeth spaced apart thereon, and connects threads of the straight portion. Each of the cutting teeth has a sawtooth like shape and is sloping at an angle. The cutting teeth can cut the wood into relatively small bits on the contact with it when the screw is being screwed into the wood, and drive part of the bits out of the hole of the wood to prevent the wood from being cracked. The cutting teeth can help the screw to be screwed into the wood with relatively great speed and small resistance.

2 Claims, 2 Drawing Sheets

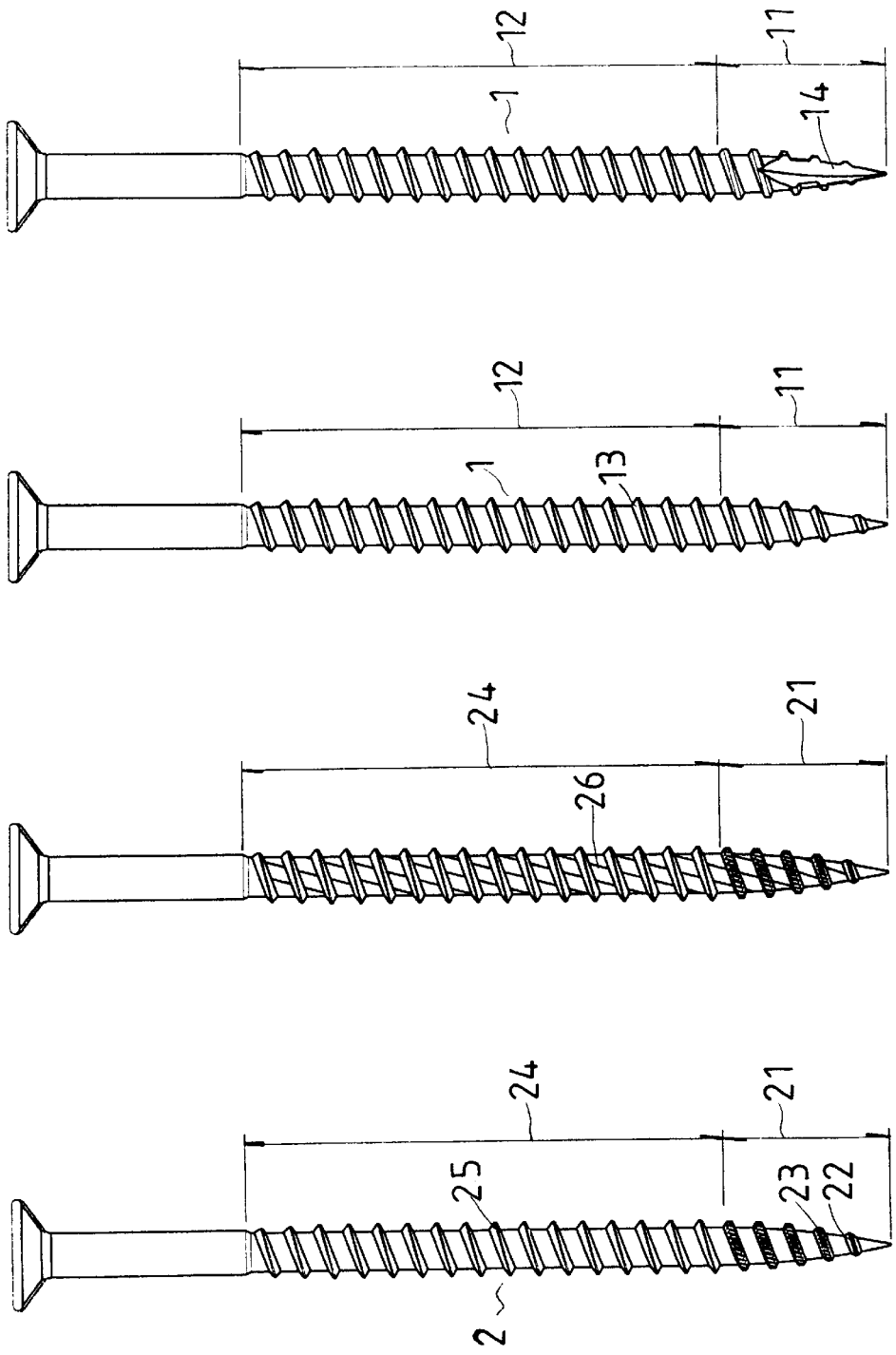

6,056,491

SCREW HAVING CUTTING TEETH FORMED ON THREADS THEREOF

BACKGROUND OF THE INVENTION

This invention relates to a screw for carpentry. A heretofore known screw 1 as shown in FIG. 6, includes a screw-in portion 11 and a straight portion 12. The screw-in portion 11 tapers toward a pointed end. A thread 13 is provided on the portions 11 and 12 for screwing the screw 1 into a wood workpiece.

However, this screw 1 is likely to crack the wood workpiece because it is forced into the workpiece without first cutting bits off the wood.

In light of this fact, the invention of the present invention has introduced a screw, as shown in FIG. 7, which has disclosed on U.S. application Ser. No. 08/922,639 and it has been issued a Notice of Allowability. The screw is made by milling the tapered portion of the screw 1 to have a cutting recessed surface 14. Thus, when the screw is being screwed into the wood workpiece, the recessed surface can cut a hole on the wood, preventing the crack of the wood caused by a forced screw-in as above mentioned. However, the milling process usually has to be performed in another factory having a milling machine. It is very inconvenient because the manufacturers have to transport the screws to another factory. And the threads 13 of the screws 1 might be damaged when a holder for milling process holds the screws.

Moreover, the screw is likely to move away from the central point when it is being screwed into a wood because the cutting recessed surface 14 is arranged on one side. Consequently, when the screw is being screwed into a wood, an unbalance of force is likely to exist, causing relatively much resistance. Also, the bits of wood cut off are relatively big and might impede the screwing in of the screw.

SUMMARY

Therefore, it is an object of the present invention to provide a screw that can be easily screwed into a wood without possibility of cracking the wood.

It is another object of the present invention to provide a screw that can be cut to have cutting teeth on the thread by the same machine used to make the thread. Thus, the manufacturing is relatively convenient.

The screw has a straight portion having a thread thereon, and has a cutting screw-in portion connected to one end of the straight portion. The cutting screw-in portion is tapered to a pointed end, and has a cutting thread connected to the thread of the straight portion. Several cutting teeth are spaced apart on the cutting thread. Each of the cutting teeth has a sawtooth-like shape, and is sloping at an angle. The cutting teeth can cut the wood into relatively small bits on the contact with the same when the screw is being screwed into the wood, and can drive some of the wood bits out of the wood. Thus, the screw can be screwed into the wood the relatively great speed and small resistance. And the screw cannot crack the wood because some of the wood bits have been driven out of the wood before the screw is screwed futher into the wood.

BRIEF DESCRIPTION OF THE DRAWINGS

The present invention will be better understood with reference to the accompanying drawings, wherein:

FIG. 1 is a front view of a screw of the present invention.

FIG. 5 is front view of a second embodiment screw of the present invention.

FIG. 6 is a front view of a prior art screw.

FIG. 7 is a front view of a second prior art screw.

DETAILED DESCRIPTION OF THE PREFERRED EMBODIMENT

Figure 4:
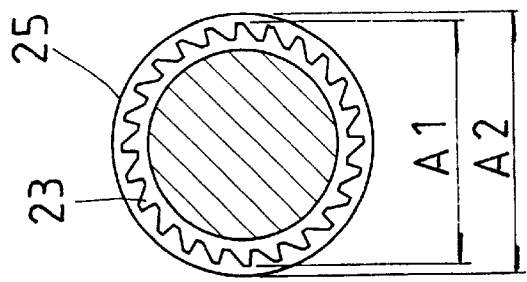
FIG. 4 is a cross-sectional view of the screw-in portion of the screw in FIG. 1.

Referring to FIG. 1, a screw 2 of the present invention includes a screw-in portion 21 and a straight portion 24. The screw-in portion 21 tapers toward one end. A cutting thread 22 is provided on the screw-in portion 21, and connected to a thread 25 on the straight portion 24. The cutting thread 22 has cutting teeth 23 spaced apart thereon.

Figure 3:
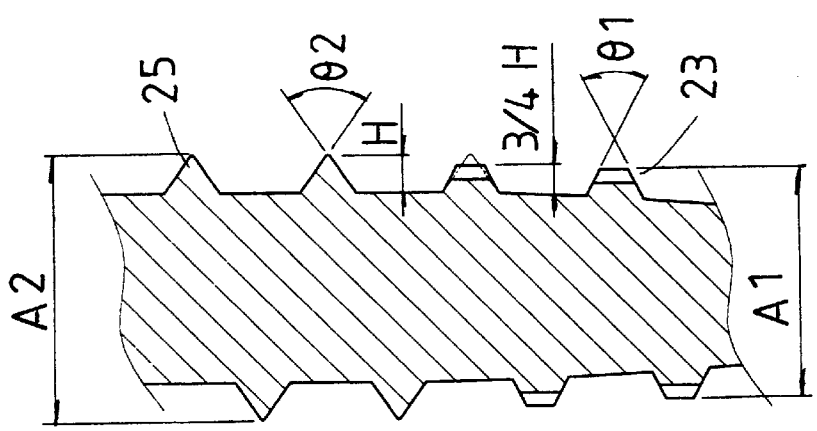
FIG. 3 is a cross-sectional view of the screw in FIG. 1.
Figure 2:
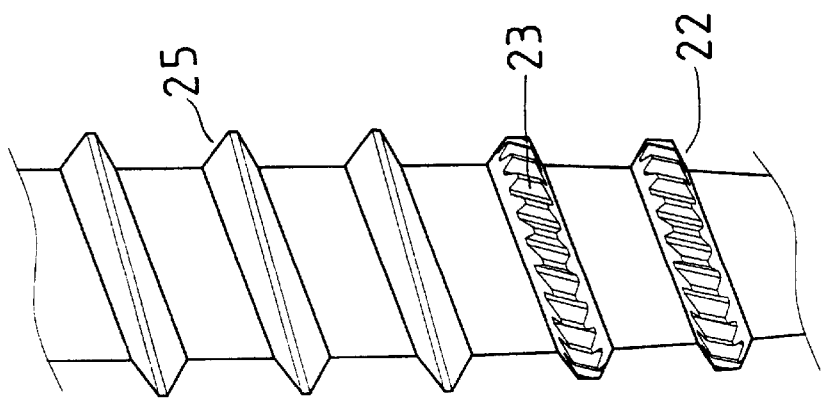
FIG. 2 is an enlarged fragmentary view of the screw in FIG. 1.

Referring to FIGS. 2, 3 and 4, the greatest diameter A1 of the screw-in portion is smaller than that A2 of the straight portion 24. The height of the thread 25 is H, while that of the cutting thread 22 is about ¾ H. And the angle θ1 is smaller than θ2. The cutting teeth 23 are arranged such that they face the screw-in direction. The cutting teeth 23 each has a sawtooth shape, and is sloping at a certain angle for permitting the screw 2 to be screwed into the wood more easily.

Furthermore, referring to FIG. 5, the screw 2 is provided with several enlongated guide projections 26 such that the cutting and getting rid of the wood bits can be easier.

In screwing the screw 2 into a wood workpiece, the cutting teeth 23 first cut a spiral groove inside the wood. Part of the wood bits cut off, which are relatively small, will be driven out of the wood by the cutting teeth 23. The rest of the wood bits will be deposited in the space between the cutting teeth 23, the screw 2 being capable of being screwed into the wood very fast and easily. Because of the spiral groove, the straight portion 24 of the screw 2 can be screwed into the wood relatively easily. And because the straight portion 24 has a greater diameter than the screw-in portion 21, the screw 2 still can be firmly connected to the wood without any loss in tightness.

From the above description, it can be understood that the screw of the present invention has advantages as follows.

1. The cutting teeth of the cutting thread can cut a spiral groove inside the wood, and drive the wood bits off the hole, helping the screw to be easily screwed into the wood. And, the wood cannot possibly crack as the earlier mentioned condition where the screw is totally forced into the wood.

2. Because the thread of the straight portion has a greater diameter than the cutting thread of the tapered screw-in portion, the straight portion can firmly connect the wood after the screw is screwed into the same.

3. The same machine making the threads, avoiding the inconvenience in transporting the screw to another factory can make the cutting teeth on the cutting thread.

4. The cutting teeth can drive off part of the wood bits cut off.

5. The rest of the wood bits can be deposited in the space between the teeth, helping the screw to connect the more tightly without possibility of cracking the wood.

6. Being spaced apart on the cutting thread, the cutting teeth can cut the wood with relatively small resistance, as compared with the side cutting recessed surface of the prior art screw.

What is claimed is:

1. A screw comprising a screw shaft having a straight portion and a screw-in portion, said straight portion having a spiral thread formed thereon, said screw-in portion being tapered toward a pointed end of said screw and having a continuous cutting thread contiguously extending from said spiral thread of said straight portion, said continuous cutting thread having a plurality of cutting teeth formed on an outer perimeter thereof.

2. The screw as claimed in claim 1, wherein said cutting thread has a first predetermined height dimension, said thread of said straight portion having a second predetermined height dimension, said first predetermined height dimension being ¾ of said second predetermined height dimension.

\* \* \* \* \*